(12) United States Patent
Considine, Jr. et al.

(10) Patent No.: US 9,791,079 B2
(45) Date of Patent: Oct. 17, 2017

(54) QUICK CONNECTOR FOR HYDRAULIC HOSE COUPLING

(71) Applicant: Caterpillar Inc., Peoria, IL (US)

(72) Inventors: Patrick E. Considine, Jr., Aurora, IL (US); Carl H. Rempert, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 14/659,033

(22) Filed: Mar. 16, 2015

(65) Prior Publication Data

US 2016/0273689 A1 Sep. 22, 2016

(51) Int. Cl.
*F16L 21/08* (2006.01)
*F16L 21/035* (2006.01)
*F16L 21/06* (2006.01)

(52) U.S. Cl.
CPC ............ *F16L 21/08* (2013.01); *F16L 21/035* (2013.01); *F16L 21/065* (2013.01)

(58) Field of Classification Search
CPC .......... B60D 1/64; F16L 21/08; F16L 21/035; F16L 21/06; F16L 21/065
USPC ....... 285/368, 364, 366, 338, 354, 373, 351, 285/347
See application file for complete search history.

(56) References Cited

U.S. PATENT DOCUMENTS

| | | | | |
|---|---|---|---|---|
| 115,917 A * | 6/1871 | Wharton | ............ | F16L 27/0828 285/347 |
| 2,726,104 A * | 12/1955 | Boitnott | ............ | F16L 27/082 285/354 |
| 4,358,140 A * | 11/1982 | Jonsson | ............ | F16L 37/1225 285/373 |
| 4,407,533 A * | 10/1983 | Giebeler | ............ | F16L 27/0832 285/351 |
| 4,478,435 A * | 10/1984 | Cheshier | ............ | F16L 27/0808 285/351 |
| 5,083,820 A * | 1/1992 | Hopperdietzel | ........ | F16L 47/06 285/351 |
| 5,104,153 A * | 4/1992 | Corcoran | ............ | F16L 21/06 285/112 |
| 5,480,193 A * | 1/1996 | Echols | ............ | F16L 21/06 285/318 |
| 5,553,902 A * | 9/1996 | Powers | ............ | F16L 19/0212 285/351 |
| 7,350,832 B1 * | 4/2008 | Kiely | ............ | F16L 19/0218 285/354 |
| 7,490,388 B2 | 2/2009 | Van Walraven | | |
| 8,328,245 B2 | 12/2012 | Gayer et al. | | |
| 9,114,687 B2 * | 8/2015 | Dorland | ............ | B60H 1/00571 |
| 9,416,900 B2 * | 8/2016 | Kang | ............ | F16L 57/02 |

(Continued)

FOREIGN PATENT DOCUMENTS

| | | | | |
|---|---|---|---|---|
| CA | 2732483 A1 * | 8/2011 | ............ | F16L 21/065 |
| CA | WO 2015191043 A1 * | 12/2015 | ............ | F16L 27/0816 |

(Continued)

*Primary Examiner* — David E Bochna

(74) *Attorney, Agent, or Firm* — Miller, Matthias & Hull LLP

(57) ABSTRACT

A hydraulic fluid line coupling system is disclosed. The coupling may include a female fitting, a male fitting, first and second elastomeric seals between the female fitting and male fitting, and a clamp surrounding the female fitting, male fitting, and first and second elastomeric seals.

14 Claims, 6 Drawing Sheets

(56) References Cited

U.S. PATENT DOCUMENTS

| | | | |
|---|---|---|---|
| 2003/0214130 A1* | 11/2003 | Schroeder | F16L 21/08 285/205 |
| 2004/0084094 A1* | 5/2004 | Kenmotsu | F16L 21/065 137/587 |
| 2007/0013188 A1* | 1/2007 | Dallas | F16L 17/08 285/354 |
| 2014/0083549 A1 | 3/2014 | Boyanich | |
| 2016/0208707 A1* | 7/2016 | Meyers | F16L 21/06 |

FOREIGN PATENT DOCUMENTS

| | | | | |
|---|---|---|---|---|
| CN | 203614918 U | | 5/2014 | |
| DE | 4428572 A1 | * | 2/1996 | F16L 21/08 |
| DE | 102010009360 A1 | * | 8/2011 | F16L 21/08 |
| DE | 102013107780 B3 | * | 12/2014 | F16L 21/065 |
| DE | 102013113755 A1 | * | 6/2015 | F16L 23/08 |
| DE | 102014212625 A1 | * | 12/2015 | F16L 21/08 |
| EP | 0969238 A1 | * | 1/2000 | F16L 21/06 |

\* cited by examiner

QUICK CONNECTOR FOR HYDRAULIC HOSE COUPLING

TECHNICAL FIELD

The present disclosure generally relates to hydraulic systems and, more particularly, relates to couplings for hydraulic hoses and tubes of hydraulics systems.

BACKGROUND

Hydraulics are used in numerous applications. For example, with earth moving, construction, and agricultural equipment, various implements and attachments are powered by hydraulic cylinders. Using a track-type tractor as an example, the blade, bucket or other implement on the front of the loader are attached to boom arms swingably attached to the chassis of the track-type tractor. Movement of the boom arms and implements are powered by hydraulic cylinders. The hydraulic cylinders are in turn in fluid communication with a hydraulic fluid pump powered by an engine mounted on the chassis. Accordingly, it can be seen that multiple couplings are needed when communicating the hydraulic fluid from the pump to the cylinders.

While effective, and used for decades, the couplings between the various tubes and hoses of the hydraulic system are particularly prone to leakage. Such leakage necessarily detrimentally affects the efficiency of the machine, adds cost to operation of the machine, and disturbs the environment.

In light of the foregoing, it has been known to provide robust couplings between the hydraulic conduits of such hydraulic systems. Such robust couplings typically include a plurality of threaded bolts connecting fittings attached to the adjacent hydraulic hoses. The inclusion of multiple bolts, typically four, thus makes it a fairly time consuming process to connect and disconnect conduits. In addition, current couplings are rotationally sensitive in that the mating halves of the coupling must be symmetrically aligned before the bolts can be attached. This also adds to the time involved with changing conduits. Moreover, leakage from such robust connectors continues to be problematic.

With respect to patented technology, U.S. Pat. No. 7,490,388 discloses a clamp for connecting a duct to a base surface which includes a hinged clamp assembly sized so as to circumscribe the ducts being joining. A threaded bolt removably connects the two halves of the clamp together. However, such a device does not provide any sealing capability whatsoever.

Accordingly, it can be seen that a need exists for a hydraulic fluid line coupling system with improved resistance to leakage, reduced reliance on rotational orientation of the coupling components, quick assembly and disassembly, and which is designed for reduced likelihood of accidental pressure discharge.

SUMMARY

In accordance with one aspect of the disclosure, hydraulic fluid line coupling system is disclosed which may comprise a female fitting, a male fitting, and a clamp surrounding the female fitting and the male fitting.

In accordance for another aspect of the disclosure, a method of sealing a hydraulic fluid line coupling system is disclosed which may comprise inserting a male fitting into a female fitting, sealing the male fitting to the female fitting using first and second elastomeric rings, and securing the male fitting to the female fitting using a clamp.

In accordance with yet another aspect of the disclosure, machine is disclosed which may comprise a chassis, engine mounted on the chassis, a hydraulic fluid pump powered by the engine, hydraulic cylinder in fluid the communication with the hydraulic fluid pump, a plurality of a hydraulic fluid tubes connecting the hydraulic fluid pump and the hydraulic cylinder, hydraulic fluid line coupling system are connecting the plurality of the hydraulic fluid tubes together, each hydraulic fluid line coupling system including a male fitting, a female fitting, a first and second elastomeric seals between the male and female fittings, and a clamp securing the female fitting, male fitting, and first and second elastomeric seals together.

These are other aspects and features of the present disclosure will be more readily understood when read in light of the following detailed description when taken in conjunction with the accompany drawings.

While the present disclosure is susceptible to various modifications and alternative construction, certain illustrative embodiments that are shown and described below in detail. However, it is to be understood that the present disclosure is not limited to the specific embodiments disclosed, but instead includes all modifications, alternatives, constructions, and equivalents thereof.

DETAILED DESCRIPTION

Figure 1:
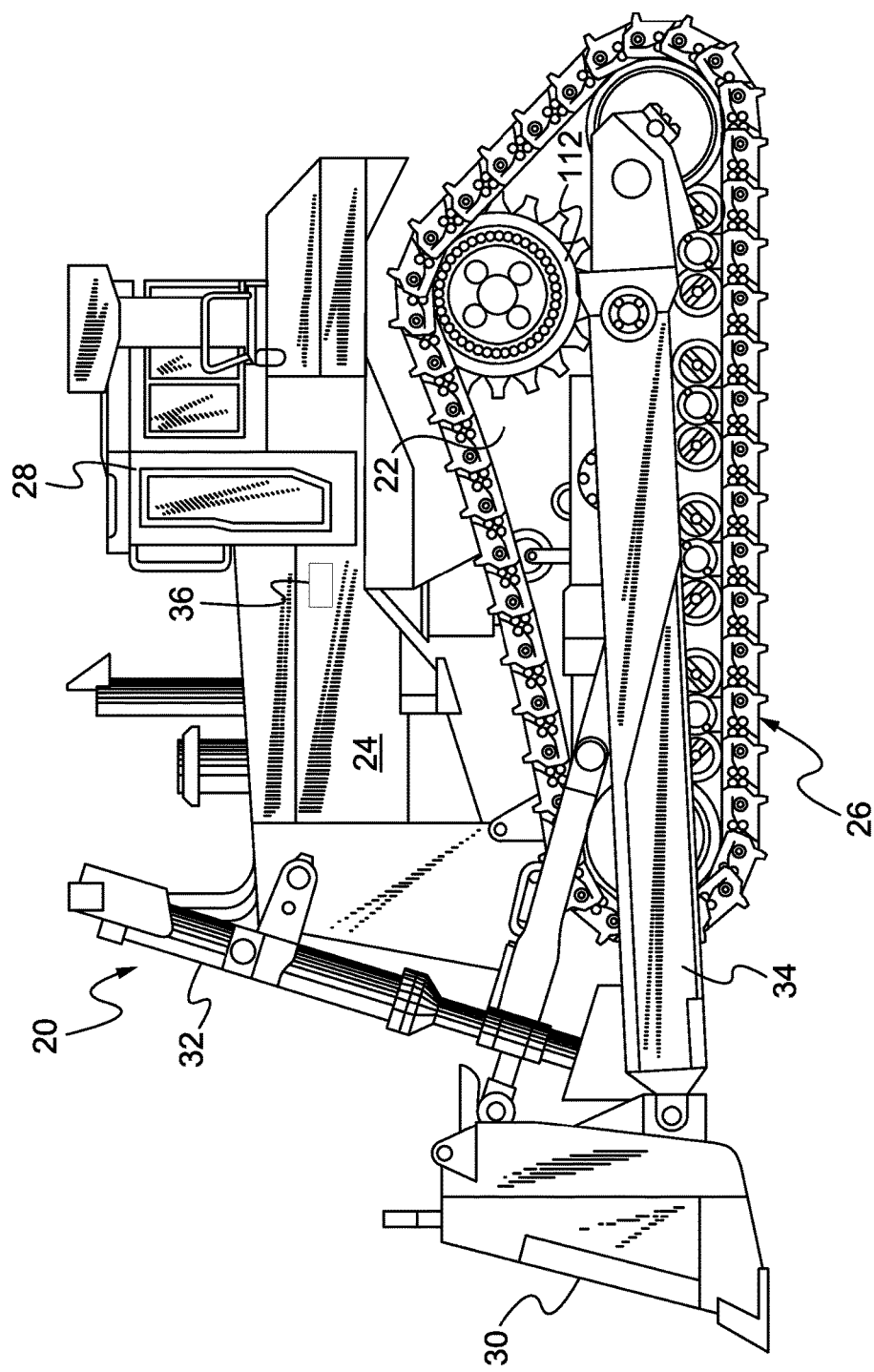
FIG. 1 is a perspective view of a machine constructed in accordance with the teachings of the present disclosure.

Referring now to drawings, and with specific reference to FIG. 1, a machine constructed in accordance to the teachings of the present disclosure is generally referred to by reference numeral 20. While the machine 20 is depicted as a track-type tractor, it is to be understood that the teachings of the present disclosure can be used with equal efficacy in connection with any other number of earth-moving machines including but not limited to loaders, motor graders, pipe layers, skid steers and the like. In addition, the teachings of the present disclosure can be used outside of earth-moving equipment including, but not limited to, other construction, agricultural, mining, marine, and on-highway machines.

With respect to the machine 20, it is shown to include a chassis 22 on which is mounted an engine 24. The machine 20 further includes first and second tracks 26 laterally flanking the machine, although in other embodiments, the form of locomotion may be provided in alternative formats such as, but not limited to, wheels. In addition, the chassis 22 supports an operator cabin 28.

As also illustrated in FIG. 1, the machine 20 may include one more implements 30 provided to perform useful work.

The implement 30 depicted in FIG. 1 is a blade, but other implements are certainly possible and well known. The implement 30 is movable relative to the machine 20 by way of one or more hydraulic cylinders 32 and boom arms 34. The hydraulic cylinders 32 are in fluid communication with a hydraulic fluid pump 36 by way of a plurality of hydraulic fluid conduits 38. The pump 36 in turn is powered by the engine 24.

Figure 2:
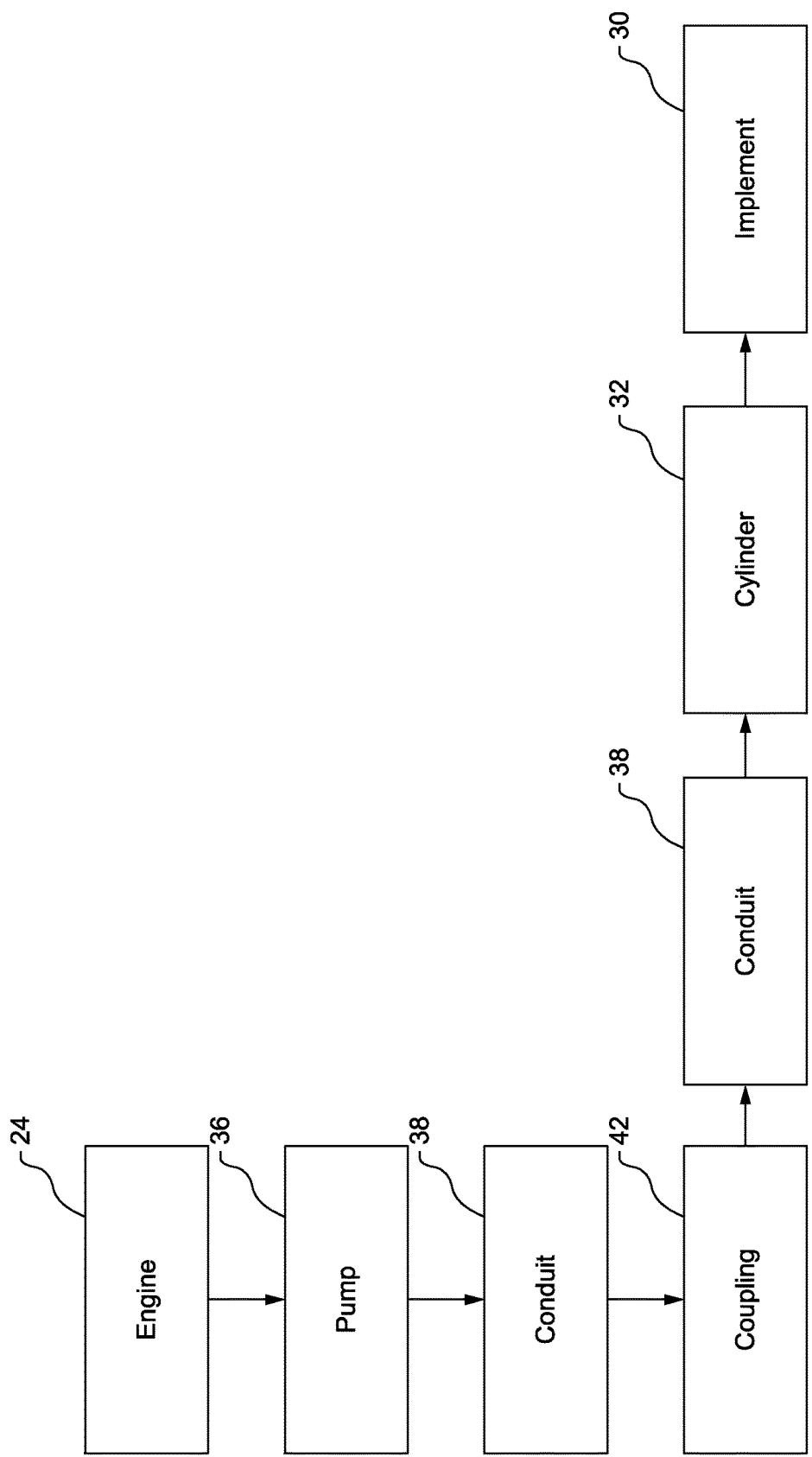
FIG. 2 is a schematic illustration of a hydraulic system constructed in accordance with the teachings of the present disclosure.

Turning now to FIG. 2, a schematic illustration of a hydraulic fluid system 40 constructed in accordance with the teachings of the present disclosure is provided. As shown therein, the hydraulic fluid system 40 includes the aforementioned pump 36 in fluid communication with the hydraulic cylinders 32 by way of conduits 38. In addition, FIG. 2 further illustrates that the plurality of hydraulic fluid conduits 38 are connected by way of hydraulic fluid line coupling systems 42 as will now be described in further detail.

Figure 4:
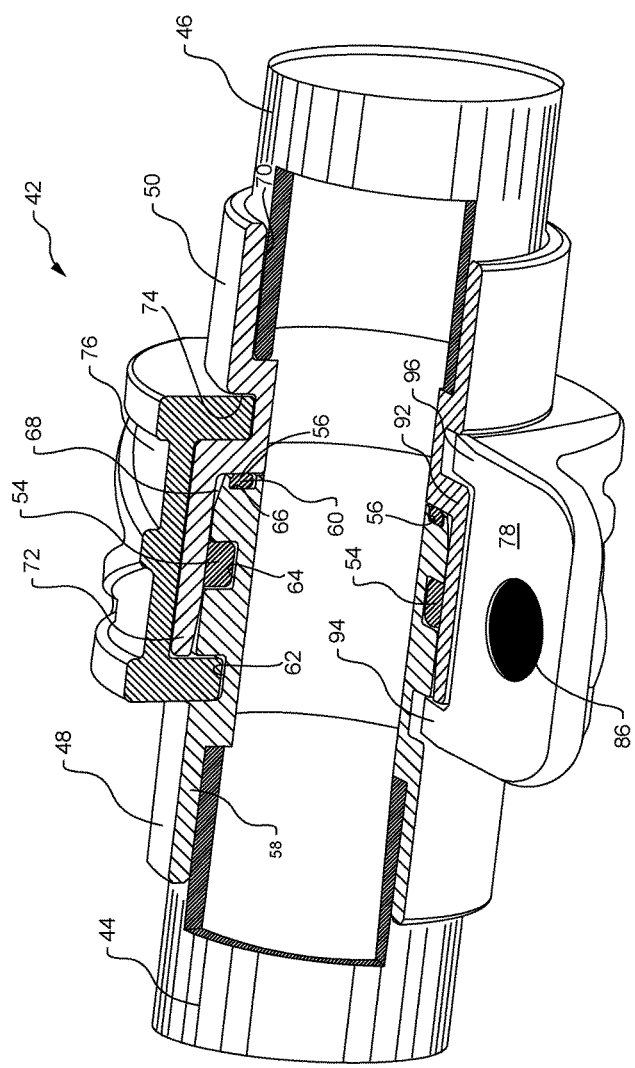
FIG. 4 is a cross-sectional view of the hydraulic fluid line coupling system of FIG. 3, with hydraulic fluid conduits attached.

The hydraulic fluid line coupling system 42 is shown, in FIG. 4 connecting a first hydraulic fluid tube or hose 44 to a second hydraulic fluid tube 46. While hydraulic fluid tube couplings have been known in the prior art, the present disclosure drastically improves on such attempts by having improved sealing capability, no reliance on rotational orientation of the tubes a coupling components, quicker assembly and disassembly, lower costs to manufacture, and improved resistance to accidental pressure discharge.

Figure 3:
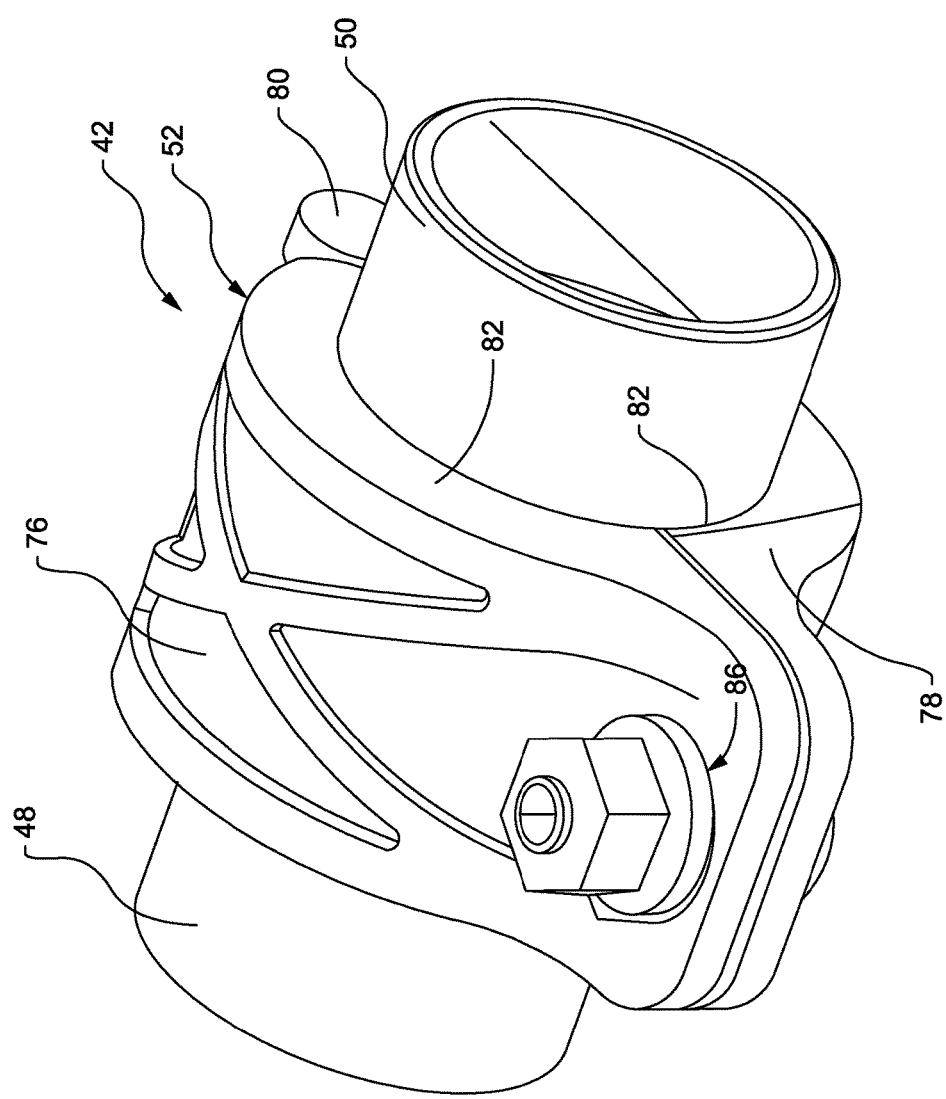
FIG. 3 is a perspective view of a hydraulic fluid line coupling system constructed in accordance with the teachings of the disclosure.
Figure 5:
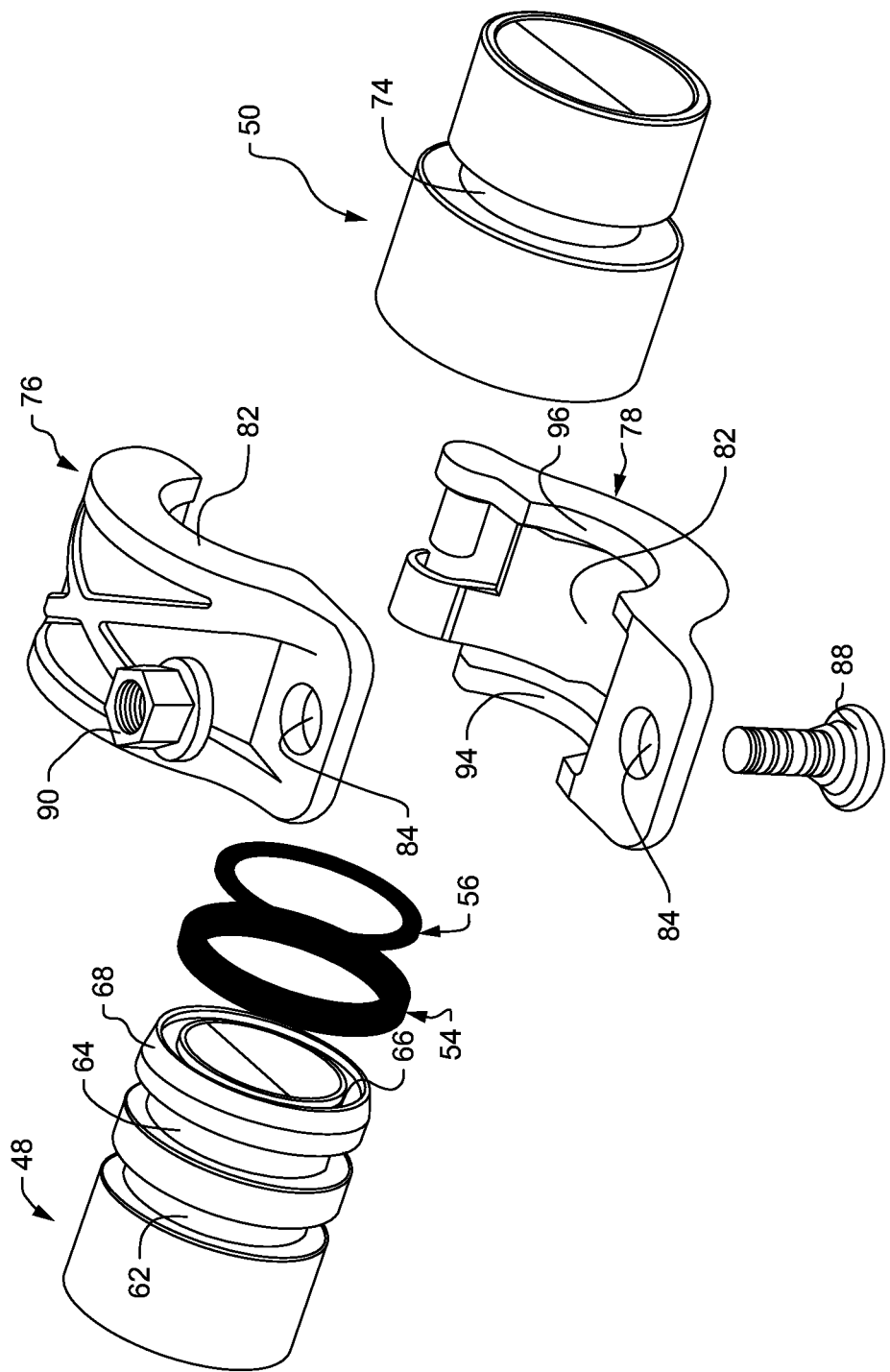
FIG. 5 is an exploded view of the hydraulic fluid line coupling system of FIG. 3.

As shown in FIGS. 3-5, the hydraulic fluid line coupling system 42 includes a male fitting 48, a female fitting 50, a clamp 52, a first elastomeric seal 54 and a second elastomeric seal 56. With specific reference to FIG. 5, the male fitting 48 is shown in detail to be substantially cylindrical in shape including a hose or proximal end 58 connected to the first tube 44 and a sealing or distal end 60. Of course in other embodiments the male fitting need not be substantially cylindrical in shape but could be other cross-section shapes such as but not limited to such as square, triangular, hexagonal, or other polygonal shapes. Intermediate the proximal and distal ends 58 and 60 the male fitting 48 is shown to also include first and second circumferential or radial grooves 62 and 64. In addition, the distal end 60 is shown to include an axial or face groove 66, as well as a tapered rim 68, the importance of which will be described in further detail herein.

With respect to the female fitting 50, it is also shown in detail in FIG. 5. The female fitting 50 is also substantially cylindrical in shape including a proximal or hose end 70 and a distal or sealing end 72. A circumferential groove 74 is provided there between. Moreover, the distal or sealing end 72 is shown to have a larger diameter and the proximal or hose end 70, so as to facilitate receipt of the male fitting 48. As with the male fitting 48, the female fitting 50 need not be substantially cylindrical in shape but rather may be the afore-mentioned shapes as well, as long as complementarily shaped and sized relative to the male fitting 50.

With respect to the clamp 52, it is shown best in FIG. 5 to be comprised of first and second halves or clam shell halves 76 and 78. A first and second clam shell halves 76 and 78 are pivotably connected by way of a hinge 80 and each include an arcuate shroud 82 sized so as to frictionally interfit with the male fitting 48 and female fitting 50. In addition, the clamp 52 includes apertures 84 adapted to receive a fastener 86 depicted in the illustrated embodiment as a threaded bolt 88 and nut 90. In other embodiments, of course other forms of fasteners 86 can be provided. While not depicted, it is to be understood that the first or second clam shell halves 76, 78 may be fastened, as by welding or the like to the chassis 22 or other surface of the machine 20.

Finally, also depicted in FIG. 5 are the first elastomeric radial seal 54 and the second elastomeric face 56. Whereas the male fitting 48, female fitting 50 and clamp 52 are manufactured from rigid materials such as, but not limited to, steel and other metals, the elastomeric seals 54 and 56 are manufacture from flexible materials such as, but not limited to, rubber and polymeric O-rings, gaskets, and the like. Accordingly, redundant sealing functionally is provided by the present disclosure unknown by the prior art. While the depicted embodiment shows a radial seal 54, and a face seal 56, it is to be understood that in other embodiments, the face seal 56 could be provided as a second radial seal. In still further embodiments, more than two seals, or less than two seals, could be provided.

When assembled, the hydraulic fluid line coupling system 42 joins the first tube 44 and second tube 46, as shown best in FIG. 4, in a fluid tight arrangement with redundant seals for robustness against leaks, no reliance on rotational orientation of the various components for assembly, quick assembly, and greatly improved ability to prevent accidental pressure discharges. These features are perhaps best illustrated in the sectional view of FIG. 4. As will be noted therein, the redundant sealing feature is provided by way of the first elastomeric seal 54 and second elastomeric seal 56. As shown therein, the first elastomeric seal 54 is sized so as to be inserted within the second circumferential groove 64 of the male fitting 48. When the female fitting 50 is received around the male fitting 48, the first elastomeric seal 54 is compressed within the second circumferential groove 64 so as to prevent any fluid transmission therebetween. To improve longevity of the radial seal 54, a back-up ring (not shown) could be used. The back-up ring could be angular in shape and residue within the radial groove 64 to support the radial seal 54 so as to not extrude due to hydraulic pressure. In some embodiments more than one back-up ring could be used which each radial seal so as to flank the radial seals and provide support from both sides.

In addition, the second elastomeric seal 56 is received within the axially or face groove 66 such that when the male fitting 48 is thoroughly received within the female fitting 50, the second elastomeric seal 56 is compressed against a radially inwardly directed shoulder 92 of the female fitting 50. So as to facilitate fluid tight engagement between the male and female fittings 48 and 50, it will be noted that the tapered rim 68 is provided so as to draw the male fitting fully against the shoulder 92 when the hydraulic fluid line coupling system 42 is assembled.

While the first and second elastomeric seal 54 and 56 provide the redundant sealing capabilities guarding against leaks, the improved ability of the hydraulic fluid line coupling system 42 against accidental pressure discharge is provided by way of the clamp 52. As shown best in FIG. 4, each clam shell half 76 and 78 is provided with first and second radially inwardly directed ribs 94 and 96. The ribs 94 and 96 are sized as to be frictionally received within the first circumferential groove 62 of the male fitting 48 and the circumferential groove 74 of the female fitting 50, respectively. Moreover, as the clam shell halves 76 and 76 are secured by way of the hinge 80 at one end and the fastener 86 at the other, the hydraulic fluid line coupling system 42 cannot be accidentally disconnected and thus accidental pressure discharges are avoided. In an alternative embodiment, the provision of the ribs and grooves could be reversed. Put another way, the ribs 94 and 96 could be provided on the male and female fittings 48, 50, respectively, with the grooves 62 and 64 being provided in the clam shell halves 76 and 78.

Not only does the hydraulic fluid line coupling system 42 of the present disclosure provide for improved sealing and accidental pressure discharge prevention, but as will be noted, all of the components described above are not reliant on any particular rotational orientation so as to be effective. This is in marked contrast to prior art couplings which required the connecting components of the coupling to be rotated in a particular orientation before being connected. In so doing, the speed with which the coupling 42 can be assembled and disassembled is greatly improved.

Figure 6:
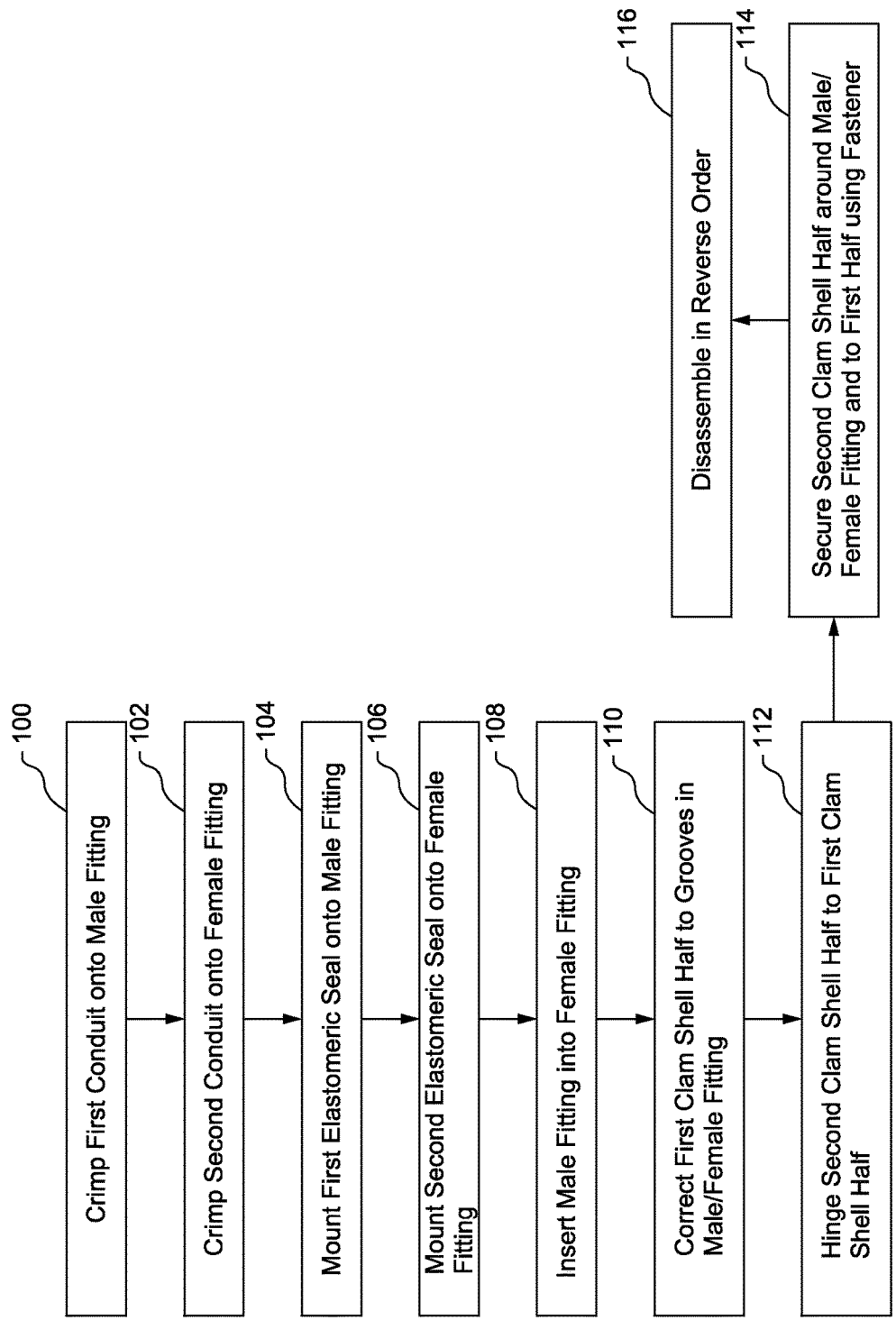
FIG. 6 is a flow chart depicting a sample sequence of steps which may be practiced in accordance with the teachings of the present disclosure.

Referring now to FIG. 6, a flow chart depicting the sample sequence of steps which may be practiced in conjunction with the teachings of the present disclosure is provided. Stated differently, the present disclosure does not only set forth structure enabling improved sealing capability and hydraulic fluid line coupling system, but also a method of improved sealing and hydraulic fluid line coupling system as well.

Starting with a step 100, the method includes attaching the male fitting 48 to the first tube 44. This may be done as by crimping, welding, brazing or the like. Similarly, in a second step 102, the female fitting 50 is attached to the second tube 46. Once the male and female fittings 48 and 50 are attached to the tubes 44 and 46, the first and second elastomeric seals 54 and 56 are mounted to the male fitting 48 as indicated in steps 104 and 106 respectively. In a next step 108, the male fitting 48 is then inserted into the female fitting 50 with the first and second elastomeric seals 54 and 56 being compressed there between. In order to secure the fitting 48, 50 together, the ribs 94, 96 of the first clam shell half 76 are then inserted into the first circumferential groove 62 of the male fitting 48 and the circumferential groove 74 of the female fitting 50, respectively, as indicated in step 110. In a step 112, the second clam shell half 78 is then hingedly attached to the first clam shell half 76. In a step 114, the first and second clam shell halves 76 and 78 are then secured together by way of the fastener 86.

While the foregoing sets forth a method for connecting the first and the second tubes 44 and 46, it is to be understood that the method of the present disclosure also includes a method for quickly disassembling the hydraulic fluid line coupling system 42 as well. In so doing, in a step 116, the hydraulic fluid line coupling system 42 is disassembled simply by conducting the steps 108 through 114 in reverse order.

INDUSTRIAL APPLICABILITY

In operation, the present disclosure can find industrial applicability, in a number of different settings. For example, in the construction of earth-moving machines, multiple hydraulic fluid tubes are routed in and around the machine. As each of those tubes needs to be interconnected, the present disclosure sets forth a coupling for doing so in a reliable, sealed manner without any reliance upon the rotational orientation of the components. In addition, it does so quickly, at a minimal of cost, and with greatly improved ability to prevent accidental pressure discharge.

With respect to improved sealing capability, such is set forth by providing redundant seals in the form of first and second elastomeric seals between the male and female fitting of the coupling. In so doing, if one seal were to degrade or even fail, the second seal will be able to continue to provide leakage prevention.

With respect to avoiding rotational orientation reliance, it can be seen that each of the components of the coupling are provided in symmetric fashion such that regardless of the rotational orientation of the components the coupling can be assembled and disassembled with ease.

With respect to speed of assembly and disassembly, as opposed to prior art devices which both require a specific rotation orientation to be operable, and multiple fasteners for providing the seal, the present disclosure provides a single fastener which simply needs to be undone for the coupling to be disassembled.

Finally, with regard to prevention of accidental pressure discharge, as the assembly is connected by way of a robust fastener such as a nut and bolt, and the clamp itself employs circumferential ribs directly by physically engaging the male and female fittings, the likelihood of the coupling coming apart and causing accidental pressure discharge is greatly reduced.

What is claimed is:

1. A hydraulic fluid line coupling system, comprising;
a female fitting having a proximal end comprising a recess configured to circumferentially engage an outer circumference of a second fluid line, the female fitting comprising a radially inwardly directed internal shoulder;
a male fitting received with the female fitting having a hose end comprising a recess configured to circumferentially engage an outer circumference of a first fluid line, the male fitting having a tapered rim positioned at a distal end comprising an axial groove configured to receive a face elastomeric seal, the axial groove positioned equidistant between an inner radius and an outer radius of the tapered rim, the face elastomeric seal configured to sealingly compress into the radially inwardly directed internal shoulder; and
a clamp surrounding the female fitting, male fitting, a first elastomeric seal and a second elastomeric seal, wherein the clamp includes first and second clam shell halves hinged together.

2. The hydraulic fluid line coupling system of claim 1, further including a fastener securing the first and second clam shell halves together.

3. The hydraulic fluid line coupling system of claim 2, wherein the first and second clam shell halves include first and second radially inwardly directed ribs, the first rib engaging a groove in the male fitting, the second rib engaging a groove in the female fitting.

4. The hydraulic fluid line coupling system of claim 3, wherein the distal end of the male fitting further includes a circumferential groove receiving a radial elastomeric seal configured to sealingly compress into a sealing end of the female fitting.

5. The hydraulic fluid line coupling system of claim 4, wherein the clamp forces the face elastomeric seal into compression against the radially inwardly directed internal shoulder of the female fitting.

6. A method of sealing a hydraulic fluid line coupling, comprising:
inserting a male fitting having a hose end comprising a recess configured to circumferentially engage an outer circumference of a first fluid line into a female fitting having a proximal end comprising a recess configured to circumferentially engage an outer circumference of a second fluid line;
sealing the male fitting to the female fitting using first and second elastomeric rings;

securing the male fitting to the female fitting using a clamp; and further including positioning a first clam shell half of the clamp around the male and female fitting, and then positioning a second clam shell half around the male and female fitting.

7. The method of claim 6, further including positioning the first elastomeric ring radially between the male fitting and female fitting.

8. The method of claim 7, further including positioning the second elastomeric ring axially between the male fitting and the female fitting.

9. The method of claim 6, further including connecting the first and second clam shell halves around the male and female fittings using a hinge and a fastener.

10. The method of claim 9, further including providing the fastener in the form of a threaded bolt.

11. The method of claim 6, further including radially inwardly extending ribs from a first clam shell halve and a second clam shell halve, and inserting the ribs into grooves in the male fitting and female fittings.

12. The method of claim 9, further including drawing the male fitting into the female fitting by tapering a distal end of the male fitting.

13. A machine, comprising;
a chassis;
an engine mounted on the chassis;
a hydraulic fluid pump powered by the engine;
a hydraulic cylinder in fluid communication with the hydraulic fluid pump;
a plurality of hydraulic fluid tubes connecting the hydraulic fluid pump and the hydraulic cylinder; and
a hydraulic fluid line coupling system connecting the plurality of hydraulic fluid tubes together, each hydraulic fluid line coupling system including a male fitting having a hose end comprising a recess configured to circumferentially engage an outer circumference of a first fluid line, the male fitting having a tapered rim, the tapered rim comprising an axial groove configured to receive a face elastomeric seal, the face elastomeric seal configured to sealingly compress into a radially inwardly directed internal shoulder of a female fitting, the distal end comprising a circumferential groove configured to receive a radial elastomeric seal, the radial elastomeric seal configured to sealingly compress into a sealing end of the female fitting, the female fitting having a proximal end comprising a recess configured to circumferentially engage an outer circumference of a second fluid line,
and a hinged clamp securing the female fitting, male fitting, the face elastomeric seal, and the radial elastomeric seal together.

14. The machine of claim 13, wherein the clamp includes first and second clam shell halves hinged together and secured with a threaded bolt.

* * * * *